United States Patent [19]

Doughty et al.

[11] Patent Number: 5,492,882
[45] Date of Patent: Feb. 20, 1996

[54] CHROMIUM-FREE IMPREGNATED ACTIVATED UNIVERSAL RESPIRATOR CARBON FOR ADSORPTION OF TOXIC GASES AND/OR VAPORS IN INDUSTRIAL APPLICATIONS

[75] Inventors: David T. Doughty, Coraopolis; William J. Knebel, Mars; John W. Cobes, III, Oakdale, all of Pa.

[73] Assignee: Calgon Carbon Corporation, Pittsburgh, Pa.

[21] Appl. No.: 97,423

[22] Filed: Jul. 26, 1993

Related U.S. Application Data

[63] Continuation of Ser. No. 799,488, Nov. 27, 1991, abandoned.

[51] Int. Cl.⁶ .................................................. B01J 20/20
[52] U.S. Cl. .................... 502/417; 502/416; 423/460; 128/205.27; 128/205.28; 128/205.29
[58] Field of Search .................................. 502/417, 416, 502/183; 128/205.27, 205.28, 205.29; 423/460

[56] References Cited

U.S. PATENT DOCUMENTS

| | | | |
|---|---|---|---|
| 2,920,051 | 1/1960 | Wiig et al. | 502/417 |
| 3,355,317 | 11/1967 | Keith, II et al. | 427/215 |
| 4,210,628 | 7/1980 | Ninomiya et al. | 423/239.1 |
| 4,271,133 | 6/1981 | Tellis | 423/236 |
| 4,534,944 | 8/1985 | Roydhouse | 423/210 |
| 4,594,231 | 6/1986 | Hishino et al. | 502/416 |
| 4,677,096 | 6/1987 | Van Der Smissen | 502/417 |
| 4,801,311 | 1/1989 | Tolles | 55/71 |
| 4,996,030 | 2/1991 | Kitahara et al. | 423/210 |
| 5,063,196 | 11/1991 | Doughty | 502/417 |
| 5,113,856 | 5/1992 | Van Der Smissen | 128/205.27 |
| 5,320,817 | 6/1994 | Hardwick et al. | 423/237 |

FOREIGN PATENT DOCUMENTS

| 237154 | 7/1986 | Germany | 502/41 |
|---|---|---|---|

*Primary Examiner*—Anthony McFarlane
*Attorney, Agent, or Firm*—Titus & McConomy

[57] ABSTRACT

An activated carbon adsorbent for removing nosioux gases and vapors from a contaminated air stream, and method of making same. The activated carbon has impregnated therein at least one compound selected from each of three groups of compounds. The three groups of compounds comprise sulfuric acid and sulfuric acid salts; molybdenum compounds, and copper compounds and zinc compounds. The amount of at least one sulfuric acid or salt thereof compound present is up to 10% by sulfate, by weight, the one molybdenum compounds is present in amounts up to 10% by weight, as molybdenum, and the total amount of copper or zinc compounds present is a total amount not greater than 20% by weight as total copper and zinc. The disclose adsorbents are desirably used in universal filters.

19 Claims, No Drawings

CHROMIUM-FREE IMPREGNATED ACTIVATED UNIVERSAL RESPIRATOR CARBON FOR ADSORPTION OF TOXIC GASES AND/OR VAPORS IN INDUSTRIAL APPLICATIONS

This is a continuation of Ser. No. 07/799,488 filed on Nov. 27, 1991, now abandoned.

FIELD OF THE INVENTION

The present invention relates to impregnated activated carbon adsorbents for removal of toxic materials in respirator and collective filter applications and, in particular, to a universal chromium-free impregnated carbon adsorbent for the removal of toxic gases and/or vapors in industrial applications.

BACKGROUND OF THE INVENTION

Activated carbon has long been used to remove toxic gases and vapors from a stream of gas or liquid. These activated carbons are also useful in cleaning breathing air or exhaust gases by removing various noxious agents, and may be used in gas mask filters, respirators, collective filters and other applications, and often involve the use of special impregnants to remove gases that would not otherwise be removed through the use of unimpregnated, activated carbons. Prior formulations contain chromium and/or other agents impregnated on an activated carbon, and function as adsorbents effective in removing a variety of toxic materials from a vapor or liquid. In many applications, it is desirable that a single impregnated adsorbent be effective against a range of toxic agents in a gas stream.

Known military use formulations designed to remove gases such as cyanogen chloride, hydrogen cyanide and cyanogen often contain chromium, copper, silver and other metals impregnated on an activated carbon. These adsorbents are effective in removing a large number of toxic materials. Appendix I sets forth a summary of known art involving these and other formulations.

Copper and silver have been shown to be effective in the removal of arsine and phosphine. Chlorine, hydrogen chloride, hydrogen fluoride and hydrogen sulfide are also removed by the presence of copper impregnates on activated carbon.

A number of references describe the various impregnates that may be used on activated carbon:

U.S. Pat. No. 5,063,196 discloses copper, zinc and triethylenediamine, along with other impregnates on activated carbon for military and industrial applications. U.S. patent application Nos. 07/537,311 (subject to Secrecy Order) and 07/737,369, continuation-in-part applications of this patent, disclose these and other impregnates on activated carbon.

British Patent No. 2,187,725 discloses activated charcoal impregnated with transition metal salts preferably consisting of cobalt, nickel or zinc acetate.

U.S. Pat. No. 3,355,317 to Keith et. al. discloses the use of the oxides of cobalt, copper, zinc, iron and molybdenum on activated carbon to remove hydrogen cyanide from tobacco smoke.

U.S. Pat. Nos. 2,920,050 to Blacet et. al. and 2,920,051 to Morse et. al. describe the preparation of filters which include copper, chromium, silver and molybdenum impregnants.

U.S. Pat. No. 4,801,311 to Tolles discloses an activated carbon filter material impregnated with copper, silver, and molybdenum and/or vanadium salts together with triethylenediamine.

U.S. Pat. No. 4,802,898 to Tolles discloses an activated carbon filter material impregnated with triethylenediamine, and optionally with copper and silver.

U.S. Pat. No. 4,531,953 to Groose discloses an activated carbon impregnated with copper, silver and/or chromium mixtures and triethylenediamine.

U.S. Pat. No. 4,677,096 to van der Smissen discloses an activated carbon, silica gel, molecular sieves or activated alumina which contains zinc oxide with other impregnates.

U.S. Pat. No. 4,636,485 to van der Smissen discloses catalysts and other impregnates on porous substrates to include activated carbon.

These and other references, including the 1946 NDRC report (Appendix I, Reference 10) by Grabenstetter et. al. describe the use of chromium, copper, silver, molybdenum, vanadium and other impregnants on activated carbon.

The use of impregnated activated carbon adsorbents in respirators and collective filters, either for military or industrial applications, require special considerations regarding the toxicity and carcinogenicity of the impregnants to the user. These considerations eliminate a large number of prior art potential impregnants from use in respirator and collective filter applications. This is especially the case with hexavalent chromium; for example, the wearer of a protective mask which employs a filter containing hexavalent chromium may suffer adverse consequences due to exposure to this potential health hazard.

Known formulations include a variety of materials impregnated in activated carbon to remove toxic vapors from a gas stream. The industrial requirements for the removal of such gases is described in European Standard; Respiratory Protective Devices: Gas Filters and Combined Filters: Requirements, Testing, Marking; Document CEN/TC 79/SG4-186E; pr EN141; October 1987.

German Standard DIN No. 3181 has established standards for protection against various noxious substances. As an example, breathing filters are to be marked with the identification letter "A" when they protect against organic vapors, with letter "B" when they protect against acid gases such as HCN, $H_2S$ and $Cl_2$, with letter "E" when they protect against $SO_2$, and with letter "K" when they protect against $NH_3$. A filter that protects against all such Type A, B, E and K toxic agents may appropriately be marked "A-B-E-K".

Non-impregnated activated carbons are generally effective against Type A toxic agents. Over the years, a number of filters have been developed so as to be suitable for removing gases of Type A, B, E and K, as well as combinations thereof. Metals and metal oxides of the first-row transition metal series, such as chromium and copper, are often indicated as the impregnating agents. In preparation of the filter media, the carbon is first treated with a metal reagent, and then the freshly impregnated mixture is dried and heat treated to deposit and to decompose the metal compound to its oxide. This impregnated carbon, while useful for Types A, B and/or E, depending on the application, may not be suitable as an air purification agent for other applications and/or for filters requiring a wider range of utility.

Applications requiring filters that protect against a mixture of Types B or E and K toxic agents require filter media which protect against acid gases and alkaline species such as ammonia gases. For example, combined protection against Types A, B and K toxic agents has previously been attained by impregnating a first filter media with a preparation effective against acid gases and by impregnating a second filter media with a preparation effective against alkaline species such as ammonia. These filter media are thereafter assembled in series into a two-stage filter in a single container, so as to be effective against Types B and K toxic agents (as well as against Type A toxic agents, which only require activated carbon as the filter media).

The shortcomings of two-stage filters are easily understood; they are bulkier, require more space, and are heavier than single stage filters. As minimum fill volumes of each stage must be used to meet the required performance parameters, the carbon bed dimensions (including depth or length) must be sufficient so as to allow proper contact or residence of the agent. As such, two-stage filters may not simply be made smaller or thinner so as to be advantageous to the user. Likewise, such two-stage filters result in increased flow resistance to gases through the entire filter. This effect can be debilitating to a respirator wearer who during an emergency (or routine situation involving manual labor) must breathe through a respirator that causes such a flow resistance.

Furthermore, any added resistance to the flow of inhaled air can be expected to have a negative effect on the proper "seal" of an individual respirator mask against the face of its wearer. A mask that includes a filter with greater resistance to inhalation by the user increases the likelihood that this seal may be broken, permitting poisonous gases to reach the lungs of the mask-wearer. An effective single-stage filter will consume less space, which in many situations requiring operations in close quarters, may prove to provide significant advantages over more bulky protective filters.

Similarly, the disadvantages of bulkiness and increased airflow resistance are likewise present in collective protection systems when multiple filters are used. In contrast, the reduced flow resistance to gases through single-stage filters permit a smaller, more efficient air pump to be used, which may prolong the operating life of the pump under such reduced operating pressures. Further, the reduced resistance to flow that can be achieved with a single-stage collective protection filter can be expected to permit a tighter, more reliable seal due to the lower operation pressures associated with such filters.

Likewise, admixtures of carbons impregnated according to preparations effective against different gases are known, and are also subject to the difficulty of attaining uniform blending. They would also suffer many of the disadvantages of bulkiness and pressure drop associated with multiple-stage filters.

Accordingly, the present invention is intended to provide a "universal" filter containing impregnated activated carbon that is effective in removing Type A, B, E and K toxic agents from gases and/or vapors, and may be used in industrial respirator, collective filter, and other applications. The impregnates used for the universal carbon (or other substrate) of the present invention may be impregnated on activated carbon in an efficient, reliable and cost-effective manner.

The present invention is able to provide an activated carbon that has the advantages of a chromium-free adsorbent while retaining its effectiveness in removing toxic gases and/or vapors. The single "universal" filter of the present invention containing said impregnated activated carbon is effective in removing Types A, B, E and K toxic agents from gases and/or vapors, yet avoids the health hazards associated with chromium-containing adsorbents.

The present invention is also able to provide for a more compact and easy-to-use individual, collective or similar filter. The universal carbon of the present invention is effective in smaller bed sizes, so as to permit lowered resistance to the flow of gases through that filter. When protection for all types of agents is not required, or in applications when shorter breakthrough periods are permitted, the impregnants and substrate may be modified so as to be effective in a particular desired application.

SUMMARY OF THE INVENTION

The present invention generally comprises a porous substrate onto which has been deposited various metal compounds (i.e., copper, zinc and molybdenum in the forms of carbonates, oxides and sulfates) which are capable of sorption of a number of toxic gases as contaminants in various air mixtures.

The substrate may be impregnated so as to contain, in combination, zinc carbonate (or oxide), copper carbonate (or oxide), zinc (or copper) sulfate and a molybdenum (VI) oxide moiety. The resulting homogeneous composite media can be adapted to give balanced properties which simultaneously satisfy the filter requirements containing Types A, B, E and K gases. Importantly, the chromium-free universal carbons of the present invention possess desirable sorptive capacities and service lives for each toxic agent, and can be manufactured and implemented as a single-stage filter media for multi-range protection.

Embodiments of the present invention have been found to be effective for removing, neutralizing and/or scavenging various toxic agents including, but not limited to, HCN, $H_2S$, $Cl_2$, $SO_2$ and $NH_3$, as well as for providing the desired capacity for the physisorption of organic vapors including that of $CCl_4$.

Within this media, the components of zinc is carbonate (or oxide) and copper carbonate (or oxide), alone and in combinations thereof, serve primarily to remove or effectively isolate acid gas species. Sulfates of zinc or copper are used as impregnates or are formed in situ so as to substantially enhance the ability of the media to adsorb ammonia. The addition of sulfates provides adsorption capacity beyond that provided by the zinc carbonate (or oxide) and copper carbonate (or oxide) manfix which, by itself, contributes minimally toward the latter sorptive process. The addition of the above impregnants to the substrate is accomplished in such a manner that they do not prohibitively limit the physical adsorption capacities toward organic vapors.

By selecting a suitable mixture with all the aforementioned constituents and appropriate conditions for the impregnation, drying and heat-treatment processes, an activated carbon can be impregnated in such a manner acceptable for the manufacture of a multi-range filter media which can provide protection for both acid and base gases. Thus, a combination of zinc and/or copper carbonates or oxides, zinc and/or copper sulfates or zinc and copper with sulfate, and molybdenum or its oxide can provide effective universal chromium-free filtering of Types A, B, E and K agents.

The universal respirator carbon of the present invention meets all CEN Standards to Types A, B, E and K for Class 2 industrial filter applications, as set forth in Table I. This objective can notably be met utilizing fill volumes of 300 ml or less, which can outperform competitive filters that do not possess the advantages of the chromium-free universal filters of the present invention.

TABLE I

CEN Requirements for Class 2 Respirator Protection.

| Gas | Type | Inlet Concentration (ppm) | Outlet Concentration (ppm) | Service Life (min) |
|---|---|---|---|---|
| $CCl_4$ | A | 5000 | 10 | 40 |
| $Cl_2$ | B | 5000 | 0.5 | 20 |
| $H_2S$ | B | 5000 | 10 | 40 |
| HCN | B | 5000 | 10 | 25 |
| $SO_2$ | E | 5000 | 5 | 20 |
| $NH_3$ | K | 5000 | 25 | 40 |

The present invention is effective in a broad range of compositions, to include porous activated carbon adsorbents impregnated to provide a final composition containing (each by weight percent) up to 20% or more zinc (as $ZnCO_3$, $ZnSO_4$, ZnO or $ZnMoO_4$ equivalents), up to 20% or more copper (as $CuCO_3$, $CuSO_4$, CuO or $CuMoO_4$ equivalents), up to 10% or more $SO_4{2-}$ (directly or as copper or zinc sulfate), up to 10% or more molybdenum (as $Mo_2O_7{2-}$ or $MoO_4{2-}$ equivalents) and up to 25% water or moisture. These formulations may be varied, depending on the particular application and/or performance characteristics desired. The addition of triethylenediamine (TEDA) would provide cyanogen chloride protection, although a composition that includes TEDA may not perform as would other universal carbons. Those familiar with the art of adsorption by impregnated carbons will recognize that the positive effects of the carbons of the present invention are to an extent only limited by the theoretical impregnation limits of the materials used and the particular balance of performance attributes desired.

Preferred embodiments of the present invention comprise an activated carbon adsorbent impregnated so as to result in a composition containing, by weight, from about 0–8% zinc (as $ZnCO_3$ or ZnO equivalents), 6–10% copper (as $CuCO_3$ cr CuO equivalents), 6–10% zinc and copper (as $ZnCO_3$, ZnO, $CuCO_3$ or CuO equivalents), 2–4% (w/w) zinc/or and copper (as $ZnSO_4$ or $CuSO_4$ equivalents), 1–4% (w/w) molybdenum (as $Mo_2O_7{2-}$ or $MoO_4{2-}$ equivalents) and 5–10% (w/w) water or moisture. These impregnants can be effectively dispersed over a coal-base granular (12×30 mesh) activated carbon, or similar porous media.

A specific preferred embodiment of the present invention also may include formulations comprising activated carbon impregnated with about 11% copper, 3.5% sulfate, 2.0% molybdenum and 5.0–7.0% water impregnated into activated carbon. This embodiment performs up to approximately 20% better than CEN specifications at a fill volume of 300 ml and 35% better at a fill volume of 350 ml. This universal carbon exceeds the performance of the best competitive materials, and will at the same time provide substantial protection against formaldehyde, hydrogen chloride and others.

As such, the universal filters of the present invention have wide-ranging utility, give balanced performance, and exceed the test standards as defined in the CEN Standards Methodology for Europe. The filters of the present invention also meet certain NIOSH standards. The sorptive media of the present invention, when incorporated into a respirator cartridge or canister unit associated with a respirator gas mask, collective protection device or similar application, is effective toward the generation of a purified effluent of acceptable qualities for breathing or other use in an industrial environment without the hazards associated with chromium impregnated carbons.

PRESENTLY PREFERRED EMBODIMENTS

Overview of Tests Conducted

A number of evaluations were designed and conducted to evaluate A-B-E-K performance of the carbons of the present invention. Evaluations of the protection provided against the challenges of the agents $NH_3$, $SO_2$ and $CCl_4$ were initially measured, as it had been determined that performance against these agents would be more critical in the design of a new universal chromium-free industrial carbon. The A-B-E-K agent sorption properties were tested on various carbon formulations at several media bed depths, aimed at maximizing overall performance of the universal carbons being evaluated. A variety of base carbons were tested, to include impregnated activated coal-based 12×30 mesh carbon, 12×20 mesh carbon, as well as other granular and pelletized coal and wood-based carbons. Several methods were evaluated to determine the most effective method of integrating the various required adsorptive properties.

The comparative breakthrough tests included evaluations of other universal canisters (Class 2 Industrial Filters), which were observed to have fill volumes of approximately 300–320 ml for Type A2B2E2K1 and approximately 350–380 ml for Type A2B2E2K2 filters. The media bed depth ranged from approximately 35–47 mm within canisters of diameters generally ranging from 100–105 mm. Pelletized commercial chromium-containing carbons having a pellet size of 0.8–1.2 mm and granular materials with a particle size range of approximately 12×30 mesh were tested as universal filter media. All tested media contained copper (approximately 3–7 wt.%) and chromium (approximately 1–3 wt.%); in addition, some contained zinc in a range of about 2–8 wt.%. All carbons contained various levels of moisture generally ranging from approximately 7–13 wt.%. The commercially available media appeared homogeneous in composition throughout the bed depth of the filter. Many such chromium-containing materials are capable of meeting or exceeding the CEN concentration/service life standards for Types A, B, E and K agents.

Tests were performed on several of these chromium-containing products available in the U.S. and/or European marketplace utilizing 350 ml fill volumes, as shown in Table II below. The products tested in Table II included carbons impregnated with chromium and other materials.

TABLE II

AVAILABLE CHROMIUM-CONTAINING PRODUCTS
Service Life (min.) for 350 ml fill volume.

| Carbon | $NH_3$ | $SO_2$ | $CCl_4$ | $H_2S$ | HCN | $Cl_2$ |
|---|---|---|---|---|---|---|
| Sample A | 40 | 29 | 42 | — | 65 | 46 |
| Sample B | 17 | 25 | 42 | — | 28 | — |
| Sample C | 35 | 24 | 55 | 101 | 42 | 22 |
| Sample D | 46 | 27 | 41 | — | 56 | 25 |

Preparation and Evaluation of Formulations

The variables which can affect the performance of the universal carbon product include: (1) the particular impregnants to be used, the level of these impregnants, and the initial compound from which these impregnants are obtained; (2) the solvent used to dissolve the impregnating compounds; (3) the method of impregnating the carbon base material; (4) the procedure used to dry the impregnated carbon; (5) the amount of moisture present or added; and (6)

the base carbon to be impregnated and the activity of this carbon.

In order to explore the effect of these variables, a series of samples was prepared and tested. Test studies were conducted using various combinations of zinc carbonate, copper carbonate, zinc sulfate and/or copper sulfate added to an ammoniacal solution with a constant amount of ammonium dimolybdate.

A typical impregnation solution for a test sample (Sample #16 in Table III) is as follows:

| Quantity | Material |
| --- | --- |
| 560 ml | $H_2O$ |
| 255 g | $(NH_4)_2CO_3$ |
| 317 ml | $NH_4OH$ |
| 139 g | ZnO |
| 68 g | $CuCO_3Cu(OH)_2$ |
| 22 g | $(NH_4)_2Mo_2O_7$ |
| 1000 g | 12 × 30 mesh granular carbon |

Aqueous ammonia was the solvent used to dissolve the initial metal compounds for impregnation on activated carbon. The addition-titration method was used to impregnate the carbons, in which the desired solution was added slowly with mixing to the carbon, almost to the point of wetness. One or more impregnation "cycles" may be used. For the two-cycle impregnations, the first cycle included the addition of approximately 175 ml of solution per 250 grams of carbon, and the second cycle included adding approximately 125 ml solution per 250 grams of carbon. Drying between the two impregnations was performed. Other methods of impregnation, to include dunking and spraying, should also be acceptable.

Drying of the samples in Table III below was accomplished via temperature "ramping", as follows: (1) First impregnation a) 100° C. for 30 min.; and b) 130° C. for 0 min.; (2) Second impregnation a) 100° C. for 30 min.; b) 30° C. for 30 min.; c) 160° C. for 45 min.; and d) 180° C. for 45 min.

After drying, samples were moisturized to the indicated levels by adding water. As such, the weight percent of $H_2O$ in all Tables herein is based on final wet product weight. The weight percent of all other impregnates is relative to the final dry weight of the impregnated activated carbon. A variety of moisture/water addition methods, such as exposing the carbon to a humid stream of air, should also be acceptable.

Table III sets forth the performance of a number of the chromium-free universal carbon formulations of the present invention.

TABLE III

Universal Carbon Formulation Tests

| Sample # | Impregnants (by wt. percent) | | | | | Bed Depth (mm) | Service Life (min) | | |
| --- | --- | --- | --- | --- | --- | --- | --- | --- | --- |
| | Zn | Cu | Mo | $SO_4^{2-}$ | $H_2O$ | | $NH_3$ | $SO_2$ | $CCl_4$ |
| 1 | 9 | 2.5 | 1 | 4.3 | 6 | 35 | 39 | 21 | 48 |
| | | | | | | 40 | 46 | 24 | — |
| 2 | 8.5 | 3 | 1 | 4.3 | 6 | 35 | 38 | 21 | 49 |
| | | | | | | 40 | 49 | 23 | 54 |
| 3 | 8.5 | 3 | 1 | 4.3 | 6 | 35 | 42 | 21 | 49 |
| | | | | | | 40 | 45 | 26 | — |
| 4 | 8.5 | 3 | 1 | 4.3 | 6 | 35 | 45 | 24 | 51 |
| | | | | | | 40 | 49 | 26 | 60 |
| 5 | 8.5 | 3 | 1 | 4.3 | 6 | 35 | 38 | 24 | 46 |
| | | | | | | 40 | 40 | 26 | — |
| 6 | 8.5 | 3 | 1 | 4.3 | 6 | 35 | 43 | 23 | 43 |
| | | | | | | 40 | 45 | 28 | 52 |
| 7 | 8.5 | 3 | 1 | 2.2 | 6 | 35 | 31 | 29 | 42 |
| | | | | | | 40 | 35 | 34 | 52 |
| 8[1] | 8.5 | 3 | 1 | 4.3 | 6 | 35 | 29 | 24 | 48 |
| | | | | | | 40 | — | 27 | — |
| 9[1] | 9 | 2.5 | 1 | 4.3 | 6 | 35 | 28 | 24 | 46 |
| | | | | | | 40 | — | 29 | — |
| 10 | 3 | 8.5 | 1 | 4.3 | 6 | 35 | 41 | 25 | 47 |
| | | | | | | 40 | 46 | 29 | — |
| 11 | 12.5 | — | — | 4.3 | 6 | 35 | 30 | 22 | 51 |
| | | | | | | 40 | 37 | 25 | — |
| 12[2] | 8.5 | 3 | 1 | 4.3 | 6 | 35 | 38 | 21 | 45 |
| | | | | | | 40 | 48 | 26 | — |
| 13[3] | 3 | 8.5 | 1 | 4.3 | 6 | 35 | 41 | 26 | 48 |
| | | | | | | 40 | 49 | 29 | — |
| 14[3] | 11.5 | — | 1 | 4.3 | 6 | 35 | 38 | 25 | 49 |
| | | | | | | 40 | 45 | 27 | — |
| 15[2,3] | 8.5 | 3 | 1 | 4.3 | 6 | 35 | 26 | 26 | 45 |
| | | | | | | 40 | — | 28 | — |
| 16[3] | 8.5 | 3 | 1 | 4.3 | 6 | 35 | 42 | 23 | 44 |
| | | | | | | 40 | 47 | — | — |
| 17[3] | 8.5 | 3 | 1 | 4.3 | 0 | 35 | 35 | 19 | 44 |
| | | | | | | 40 | 42 | — | — |
| 22 | 5 | 5 | 2 | — | 10 | 30 | 10 | — | — |
| 23 | 6 | 5 | 2 | 5.9 | 10 | 30 | 52 | — | — |
| 24 | 5.5 | 7.5 | — | — | 10 | 30 | 14 | — | — |
| 25 | 5 | 5 | 2 | — | 1 | 30 | — | 18 | — |

TABLE III-continued

Universal Carbon Formulation Tests

| Sample # | Impregnants (by wt. percent) | | | | | Bed Depth (mm) | Service Life (min) | | |
|---|---|---|---|---|---|---|---|---|---|
| | Zn | Cu | Mo | $SO_4^{2-}$ | $H_2O$ | | $NH_3$ | $SO_2$ | $CCl_4$ |
| | | | | | | 40 | — | 22 | — |
| | | | | | 10 | 30 | — | 25 | — |
| | | | | | | 40 | — | 36 | — |
| 26 | 6 | 5 | 2 | 5.9 | 1 | 30 | — | 10 | — |
| | | | | | | 40 | — | 16 | — |
| | | | | | 10 | 30 | — | 20 | — |
| | | | | | | 40 | — | 30 | — |
| 27 | 7.5 | 3 | 1 | 6.6 | 1 | 30 | — | 13 | 38 |
| | | | | | | 40 | — | 18 | 48 |
| | | | | | 10 | 30 | — | 18 | 29 |
| | | | | | | 40 | — | 27 | 42 |
| 28 | 11 | — | — | 5.9 | 5 | 35 | 43 | 19 | 48 |
| | | | | | | 40 | 48 | 22 | 57 |
| 29 | 9 | 2 | 1 | 5.9 | 5 | 35 | 55 | 19 | 47 |
| | | | | | | 40 | — | 23 | 55 |
| 30 | 7 | 4 | 1 | 5.9 | 5 | 35 | 53 | 19 | 47 |
| | | | | | | 40 | — | 22 | 50 |
| 31 | 9.5 | 2 | 1 | 5.1 | 5 | 35 | 54 | 20 | 42 |
| | | | | | | 40 | — | 23 | 50 |
| 32 | 9.5 | 2.5 | 1 | 5.1 | 6 | 35 | 48 | 21 | 43 |
| | | | | | | 40 | 51 | 24 | 55 |
| 33 | 8.5 | 3 | 1 | 3.7 | 6 | 35 | 43 | 22 | 50 |
| | | | | | | 40 | 48 | 25 | 53 |
| 34 | 8.5 | 3 | 1 | 3.7 | 6 | 35 | 39 | 23 | 51 |
| | | | | | | 40 | 48 | 26 | 58 |

[1] 1% Na added.
[2] .5% Na added.
[3] Zinc oxide used in preparation.

Formulations containing various loadings of copper and zinc carbonates (as $CuCO_3$, $ZnCO_3$ or equivalents) and copper and zinc as sulfates (as $CuSO_4$, $ZnSO_4$ or equivalents) or copper, zinc and sulfates as well as molybdenum onto granular coal-based 12×30 mesh carbon were discovered to have desirable $NH_3$, $SO_2$, and $CCl_4$ breakthrough performances.

Significant moisture loadings on the impregnated materials were discovered to be an important factor in enhancing the performance of the carbons. In some formulations, adequate moisture levels are necessary so that the material may unequivocally meet the CEN specification limits for $SO_2$ breakthrough performance using desirable lower fill volumes (i.e., < 350 ml). Basic metal carbonates (or oxides) loadings (as $CuCO_3$ and/or $ZnCO_3$ equivalents) of greater than 7 wt.% (and with moisture loadings of approximately 7%) onto the granular carbons were required to meet $SO_2$ specification limits at competitive fill volumes. The results of these evaluations are also set forth in Table III.

In samples including an impregnation of zinc as zinc oxide, no negative effect on the performance of the final material is noted zinc oxide may therefore be used in place of zinc carbonate.

One preferred formulation contains the basic metal carbonates (or oxides) (approximately 8–9 wt.% Zn and/or Cu; as $ZnCO_3$ and/or $CuCO_3$, equivalents) and metal sulfates (2–3 wt.% Zn and/or Cu, as $ZnSO_4$ and/or $CuSO_4$ equivalents) and low levels of molybdenum oxide (approximately 1–3 wt.% Mo (VI), as $MoO_3$ or $MoO_4 2-$, equivalents), in conjunction with significant moisture loadings (approximately 4–8 wt.%) on the final impregnated carbon. The addition of molybdenum prevents an excessive generation of $(CN)_2$ when subjecting a copper(II) metal impregnated carbon to the HCN challenge agent, as excessive levels of $(CN)_2$ created during the reaction of HCN with a copper(II) species may lead to premature breakthrough of the toxic cyanogen species and an abbreviated service life of the respirator product when subjected to the HCN agent.

In producing a chromium-free universal A-B-E-K product, all critical constituents should preferably be applied to the substrate using a single impregnation solution; and the resulting mixture could thereafter be, if necessary, thermally processed into the universal carbon product. In addition to this single impregnation method, a method involving a second impregnation (by solution or spray operation) can also be used to achieve the desired impregnant loadings. This two-step impregnation procedure can also be used to achieve uniform high-impregnate loadings, or application of a different impregnate than is applied during the first impregnation loading.

Drying the impregnated material can be achieved by a variety of methods. One desired method includes placing the carbon in a shallow tray in a forced air convection oven. The samples in Table III were prepared by heating at up to 180° C. Higher drying temperatures were observed to be beneficial to performance against ammonia. Tests to determine the effects of these temperatures on the product are set forth in Table IV. Other drying technologies should likewise result in improved ammonia service life, as well as offering other performance and manufacturing benefits.

TABLE IV

Effects of Drying Time and Temperature*

| Sample ID | Final Drying Temp. | Bed Depth (mm) | Service Life (min) | | |
|---|---|---|---|---|---|
| | | | NH$_3$ | SO$_2$ | CCl$_4$ |
| 1A | 180° C. | 35 | 42 | 23 | 48 |
|    |         | 40 | 48 | 26 | 54 |
| 1B | 180° C. add. hour | 35 | 43 | — | — |
| 2A | 195° C. | 35 | 47 | 19 | 44 |
|    |         | 40 | 55 | 24 | — |
| 2B | 210° C. | 35 | 51 | 18 | 53 |
|    |         | 40 | 58 | 21 | — |

*Wt. % makeup of all formulations: 8.5% Zn, 3.0% Cu, 1.0% Mo, 4.3% SO$_4^{2-}$, 6% H$_2$O Additional comparative performance studies were conducted using several potential copper and zinc formulations. The results of this optimization study are set forth in Table V. Preparation procedures were similar to those set forth in Table III, except that higher drying temperatures were utilized.

TABLE V

Universal Carbon Optimization Formulation Tests

| Sample # | Impregnants (by wt. percent) | | | | | Bed Depth (mm) | Service Life (min) | | |
|---|---|---|---|---|---|---|---|---|---|
| | Zn | Cu | Mo | SO$_4^{2-}$ | H$_2$O | | NH$_3$ | SO$_2$ | CCl$_4$ |
| 1.  | 5.5 | 5.5 | 1.5 | 3.5 | 7  | 35 | 44 | 22 | 46 |
|     |     |     |     |     |    | 40 | 52 | 28 | — |
| 2.  | 7   | 4   | 1.5 | 2.5 | 5  | 35 | 37 | 23 | 48 |
|     |     |     |     |     |    | 40 | 43 | 26 | — |
| 3.  | 4   | 7   | 1.5 | 4.5 | 5  | 35 | 44 | 23 | 45 |
|     |     |     |     |     |    | 40 | 52 | 27 | — |
| 4.  | 7   | 4   | 1.5 | 4.5 | 5  | 35 | 48 | 19 | 48 |
|     |     |     |     |     |    | 40 | 58 | 22 | — |
| 5.  | 7   | 4   | 1.5 | 2.5 | 9  | 35 | 38 | 24 | 47 |
|     |     |     |     |     |    | 40 | 46 | 31 | — |
| 6.  | 5.5 | 5.5 | 1.5 | 3.5 | 3  | 35 | 36 | 18 | 53 |
|     |     |     |     |     |    | 40 | 43 | 23 | — |
| 7.  | 5.5 | 5.5 | 1.5 | 3.5 | 7  | 35 | 44 | 22 | 43 |
|     |     |     |     |     |    | 40 | 51 | 26 | — |
| 8.  | 5.5 | 5.5 | 1.5 | 5.5 | 7  | 35 | 57 | 22 | 44 |
|     |     |     |     |     |    | 40 | 69 | 26 | — |
| 9.  | 4   | 7   | 1.5 | 2.5 | 5  | 35 | 35 | 24 | 49 |
|     |     |     |     |     |    | 40 | 42 | 28 | — |
| 10. | 4   | 7   | 1.5 | 2.5 | 9  | 35 | 37 | 25 | 43 |
|     |     |     |     |     |    | 40 | 45 | 31 | — |
| 11. | 5.5 | 5.5 | 1.5 | 1.5 | 7  | 35 | 29 | 23 | 47 |
|     |     |     |     |     |    | 40 | 33 | 28 | — |
| 12. | 2   | 9   | 1.5 | 3.5 | 7  | 33 | 44 | 25 | 46 |
|     |     |     |     |     |    | 40 | 48 | 29 | — |
| 13. | 5.5 | 5.5 | 1.5 | 3.5 | 11 | 35 | 48 | 25 | 41 |
|     |     |     |     |     |    | 40 | 54 | 31 | — |
| 14. | 7   | 4   | 1.5 | 4.5 | 9  | 35 | 53 | 22 | 45 |
|     |     |     |     |     |    | 40 | 62 | 26 | — |
| 15. | 9   | 2   | 1.5 | 3.5 | 7  | 35 | 46 | 22 | 45 |
|     |     |     |     |     |    | 40 | 56 | 25 | — |
| 16. | 4   | 7   | 1.5 | 4.5 | 9  | 35 | 54 | 29 | 37 |
|     |     |     |     |     |    | 40 | 70 | 34 | — |
| 17. | 5.5 | 5.5 | 1.5 | 3.5 | 7  | 35 | 49 | 26 | 43 |
|     |     |     |     |     |    | 40 | 54 | 29 | — |
| 18. | 11  | 0   | 1.5 | 3.5 | 7  | 35 | 42 | 21 | 49 |
|     |     |     |     |     |    | 40 | 46 | 25 | — |
| 19. | 0   | 11  | 1.5 | 3.5 | 7  | 35 | 43 | 25 | 47 |
|     |     |     |     |     |    | 40 | 52 | 29 | — |
| 20. | 5   | 5   | 1.5 | 3.5 | 7  | 35 | 50 | 24 | 45 |
|     |     |     |     |     |    | 40 | 57 | 29 | — |
| 21. | 6   | 6   | 1.5 | 3.5 | 7  | 35 | 45 | 25 | 43 |
|     |     |     |     |     |    | 40 | 54 | 29 | — |
| 22. | 0   | 11  | 1.5 | 5.5 | 11 | 35 | 66 | 31 | 32 |
| 23. | 0   | 11  | 1.5 | 5.5 | 3  | 35 | 57 | 21 | 48 |
| 24. | 0   | 11  | 1.5 | 1.5 | 11 | 35 | 37 | 31 | 40 |
| 25. | 0   | 11  | 1.5 | 1.5 | 3  | 35 | 27 | 22 | 52 |
| 26. | 11  | 0   | 1.5 | 5.5 | 11 | 35 | 56 | 22 | 38 |
| 27. | 11  | 0   | 1.5 | 5.5 | 3  | 35 | 49 | 20 | 48 |

The effects of the copper-to-zinc metals ratio can be noted from Tables III and V. In samples having a constant metal loading, the effects of changing the ratio of copper and zinc can be observed. Comparing a primarily zinc sample with a primarily copper sample, tests show similar performance for carbon tetrachloride, while the sulfur dioxide performance is approximately 12% better when the primarily copper formulation is used. In some cases, ammonia performance is also improved.

Ammonia service life is strongly affected by the level of sulfate on the product. An increase of 6–7 minutes in service life results from a 1% increase in sulfate (15% of the CEN Requirement of 40 minutes). Sulfate is required, as the presence of copper and/or zinc alone does not provide maximized protection. The addition of 1% moisture also improved performance by approximately 2 minutes; this performance does not appear to be affected by the choice of zinc or copper.

As such, by making slight modifications to the absolute and relative concentration levels of the various species (i.e., carbonates and sulfates) in the formulation, one can attain a balance and optimize the sorption properties for the various challenge agents. The impregnated activated carbons of the present invention can thus be tailored according to the above-described formulations, using one or a combination of the methods described, so as to meet the specific desired performance characteristics for any number of industrial and other needs.

Sources of Sulfate

It was discovered that the particular source of sulfate should not be a factor in the performance of the product. Two sets of formulations were made with identical levels of all impregnants, with the sources of sulfate being zinc sulfate, copper sulfate, ammonium sulfate, or sulfuric acid. The results of these tests are shown in Table VI. No significant differences are noted for the various forms of sulfate.

TABLE VI

Effects of the Source of Sulfate on Performance

| Form of Sulfate | Impregnants (by wt. percent) | | | | Bed Depth (mm) | Service Life (min) | | |
|---|---|---|---|---|---|---|---|---|
| | Cu | Zn | Mo | $H_2O$ | | $NH_3$ | $SO_2$ | $CCl_4$ |
| Zinc Sulfate | 3.0 | 8.5 | 1.5 | 7 | 35 | 42 | 23 | 48 |
| | | | | | 40 | 48 | 26 | 55 |
| Copper Sulfate | 3.0 | 8.5 | 1.5 | 7 | 35 | 42 | 21 | 49 |
| | | | | | 40 | 45 | 26 | — |
| Ammonium Sulfate | 3.0 | 8.5 | 1.5 | 7 | 35 | 42 | 23 | 46 |
| | | | | | 40 | 47 | 26 | — |
| Ammonium Sulfate | 5.5 | 5.5 | 1.5 | 7 | 35 | 44 | 22 | 46 |
| | | | | | 40 | 52 | 28 | — |
| Sulfuric Acid | 5.5 | 5.5 | 1.5 | 7 | 35 | 45 | — | 50 |
| | | | | | 40 | — | 27 | — |

A preferred formulation of the present invention utilizes uses a substrate of 12×30 mesh coal-based activated carbon, impregnated with 11% Copper, 3.5% Sulfate, 2.0% molybdenum and 7% moisture.

Impregnation recipe for achieving a preferred formulation is as follows:

| Quantity | Material |
|---|---|
| 290 ml | $H_2O$ |
| 72.9 g | $(NH_4)_2CO_3$ |
| 226 ml | $NH_4OH$ |
| 22.7 g | $(NH_4)_2Mo_2O_7$ |
| 126.8 g | $CuCO_3Cu(OH)_2$ |
| 30.8 | $(NH_4)_2SO_4$ |
| 500 g | 12 × 30 mesh granular carbon |

The performance of this material can be expected to be nearly 20% better than the CEN specifications for $NH_3$, $SO_2$ and $CCl_4$ at a test bed depth of 35 mm, and 35% better at a 40 mm bed depth. (See Samples 1 and 2, below.) Table VII demonstrates in part the broad effective and useful ranges of the present universal carbons that may prove to be useful in a variety of applications of the present invention.

TABLE VII

Effective Impregnant Range Tests

| Sample | Impregnants (by wt. percent) | | | | | Bed Depth (mm) | Service Life (min) | | |
|---|---|---|---|---|---|---|---|---|---|
| | Zn | Cu | Mo | $SO_4^{2-}$ | $H_2O$ | | $NH_3$ | $SO_2$ | $CCl_4$ |
| 1. | 0 | 11.0 | 2.0 | 3.5 | 7 | 35 | 47 | 25 | 49 |
| 2. | 0 | 11.0 | 2.0 | 3.5 | 7 | 40 | 54 | 29 | 55 |
| 3. | 0 | 15 | 2 | 3.5 | 7 | 40 | 52 | 30 | 48 |
| 4. | 15 | 0 | 2 | 3.5 | 7 | 40 | 49 | 23 | 50 |
| 5. | 0 | 6 | 10 | 0 | 7 | 40 | 47 | 31 | 62 |
| 6. | 0 | 10 | 0 | 6 | 7 | 40 | 59 | 24 | 53 |
| 7. | 0 | 11 | 2 | 3.5 | 0 | 40 | 45 | 20 | 64 |
| 8. | 0 | 10 | 2 | 3 | 15 | 40 | 62 | 40 | 41 |

Use of Different Substrates

Formulations were also made to specifically test the relative advantages and disadvantages of different substrates, as set forth in Table VIII. (The base carbon used in most tests was granular coal-based 12×30 mesh.) The carbons included with these 12×30 mesh carbons were coal-based 12×20 mesh, 1.2 mm coal-based pellets, and 1.2 mm wood-based pellets. At comparable amounts of impregnants per volume of carbon, the 12×30 was clearly the superior material. The 12×30 material was 10–15% better in performance than the 12×20 mesh carbon. The smaller mesh size most likely the cause of this difference. Of the pelleted materials, the coal-based material performed much better than wood-based material, based on ammonia and carbon tetrachloride service life tests. The carbon tetrachloride service life of the 1.2 mm coal pellet substrate was comparable to that obtained using the 12×30 carbon. A product based on 1.2 mm coal-based pellets may pass specifications, although a larger fill volume (relative to 12×30 mesh) would likely be needed to achieve performance 20% higher than the specifications. To avoid this situation, a coal-based pellet of smaller diameter than the 1.2 mm coal-based pellet could be used. (Note that the impregnant loadings (on a wt. basis) for Table VIII were changed to compensate for differences in the density of the different carbon substrates.)

desirable in specific applications of the universal product. The performance of these copper/ zinc/sulfate/molybdenum formulations are set forth in Table IX below. (Note that the impregnant loadings (on a wt. basis) for Table IX were changed to compensate for differences in the density of the different carbon substrates.)

TABLE VIII

Comparison of Various Carbon Substrates (35 mm bed depth)

| Sample | Impregnants (by wt. percent) | | | | | Substrate | Service Life (min) | | |
|---|---|---|---|---|---|---|---|---|---|
| | Zn | Cu | Mo | $SO_4^{2-}$ | $H_2O$ | | $NH_3$ | $SO_2$ | $CCl_4$ |
| 1. | 8.5 | 3.0 | 1.0 | 4.3 | 6 | 12 × 30 mesh | 42 | 23 | 48 |
| 2. | 8.5 | 3.0 | 1.0 | 4.3 | 6 | 12 × 20 mesh | 39 | 19 | 43 |
| 3. | 10.2 | 3.6 | 1.2 | 5.1 | 6 | 1.2 mm coal pellets | 34 | 17 | 46 |
| 4. | 10.2 | 3.6 | 1.2 | 5.1 | 6 | 1.2 mm wood pellets | 23 | 17 | 38 |

Comparative performance tests were also run on HCN and $(CN)_2$ agents using different substrates, to determine the feasibility of using these various substrates as may be

TABLE IX

Performance Results For Various Substrates[1]

| Sample | Impregnants (by wt. percent) | | | | | Substrate | Service Life (min) | | |
|---|---|---|---|---|---|---|---|---|---|
| | $Cu^2$ | $Zn^3$ | $Zn^4$ | $Mo^5$ | $H_2O$ | | $NH_3$ | HCN | $(CN)_2$ |
| 1. | 5 | 2 | 4 | 2 | 10 | gran. mesh (12 × 20) | 36 | 33 | 34 |
| 2. | 5 | 2 | 4 | 2 | 10 | gran. mesh (12 × 30) | 52 | 46 | 45 |
| 3. | 6 | 2.4 | 4.8 | 2.4 | 10 | 1.2 mm coal pellets | 33 | 30 | 31 |
| 4. | 6 | 2.4 | 4.8 | 2.4 | 10 | 1.2 mm wood pellets | 20 | 22 | 24 |

[1] CEN Test Conditions for Class 2 Respirators; Media Bed Depth is 30 mm.
[2] Cu added as $CuCO_3 \cdot Cu(OH)_2$
[3] Zn added as $ZnCO_3$
[4] Zn added as $ZnSO_4 \cdot 7H_2O$
[5] Mo added as $(NH_4)_2Mo_2O_7$ Chloride, Hydrogen Sulfide and Formaldehyde Testing Testing was also conducted to evaluate the performance of the certain formulations against the other challenge gases (Cl$_2$ and H$_2$S) defined by the CEN specifications. (See Table X). Studies were also completed on the service life of certain formulations under CH$_2$O challenge. (See Table XI).

The Cl$_2$ 2 and H$_2$S challenge tests show that the H$_2$S performance was more than double the required 40 minutes and the Cl$_2$ was 50% above the specification of 20 minutes. During the chlorine testing, the HCl concentration was also monitored as the possibility exists for Cl$_2$ to be converted to HCl. The background level of each was approximately 0.1 ppm (breakthrough= 0.5 ppm Cl$_2$).

TABLE X

Testing for Cl$_2$ and H$_2$S Service Life

| Sample ID | Impregnants (by wt. percent) | | | | | Bed Depth (mm) | Service Life (min) | |
|---|---|---|---|---|---|---|---|---|
| | Zn | Cu | Mo | SO$_4^{2-}$ | H$_2$O | | H$_2$S | Cl$_2$ |
| 1 | 5.5 | 5.5 | 1.5 | 3.5 | 7 | 35 | 92 | 30 |
| 2 | 0.0 | 9.7 | 1.6 | 3.0 | 7.5 | 25 | 45 | 16 |
| 3 | 0.0 | 9.7 | 1.6 | 3.0 | 7.5 | 35 | 83 | 31 |
| 4 | 0.0 | 9.7 | 1.6 | 3.0 | 7.5 | 45 | — | 42 |

TABLE XI

Testing for CH$_2$O Service Life*

| Sample No. | Impregnants (by wt. percent) | | | | | CH$_2$O Breakthrough (min) |
|---|---|---|---|---|---|---|
| | Zn | Cu | Mo | Cr | SO$_4^{2-}$ | |
| 1 | 0 | 8 | 0 | 3 | 0 | 116 |
| 2** | 5.5 | 7.5 | 0 | 0 | 0 | 38 |
| 3 | 5 | 5 | 2 | 0 | 0 | 64 |
| 4*** | 8.5 | 3 | 1 | 0 | 4.3 | >124 |

*Cartridges were first equilibrated at 12.5 LPM, 25° C., and 25% RH using NIOSH test procedures; A standard cartridge (93 ml fill) was tested and 32 LPM, 25° C., 25% RH, and 100 ppm CH$_2$O.
**Test sample 12 × 20 mesh.
***Test terminated without breakthrough.

Levels of Molybdenum

Tests on the effects of using various levels of molybdenum in the present invention were also conducted, as set forth in Table XII. From this data it can be seen that molybdenum can significantly enhance ammonia service life without affecting adversely the SO$_2$ or CCl$_4$ life when the total metal loading remains the same.

TABLE XII

Effects of Molybdenum

| Sample ID | Impregnants (by wt. percent) | | | | | Bed Depth (mm) | Service Life (min) | | |
|---|---|---|---|---|---|---|---|---|---|
| | Zn | Cu | Mo | SO$_4^{2-}$ | H$_2$O | | NH$_3$ | SO$_2$ | CCl$_4$ |
| 1. | 12.5 | 0 | 0 | 4.3 | 6 | 35 | 30 | 22 | 51 |
| 2. | 11.5 | 0 | 1 | 4.3 | 6 | 35 | 38 | 25 | 49 |
| 3. | 5.5 | 5.5 | 1.5 | 3.5 | 7 | 35 | 45 | 22 | 46 |
| 4. | 5 | 5 | 2.5 | 3.5 | 7 | 35 | 52 | 25 | — |
| 5. | 0 | 11 | 1.5 | 4 | 5 | 35 | 47 | 23 | 47 |
| 6. | 0 | 10 | 2.5 | 4 | 5 | 35 | 64 | 22 | 45 |
| 7. | 0 | 11 | 2.5 | 4 | 5 | 35 | 55 | 23 | — |
| 8. | 0 | 11 | 4.5 | 0 | 7 | 35 | 40 | 27 | 49 |
| 9. | 0 | 0 | 5 | 0 | 7 | 35 | 19 | 13 | — |

Formaldehyde challenge testing was also performed. The NIOSH Requirement for CH$_2$O challenge is 50 minutes. The results of these tests are set forth in Table XI. In view of the large difference in formaldehyde performance, it is likely that the presence of sulfate enhances formaldehyde removal, and may make the universal product useful against formaldehyde.

As demonstrated Table XII, the use of molybdenum in the formulation results in significant improvement in NH$_3$ breakthrough performance. As shown above, and in Table IX, the presence of molybdenum in formulations not including zinc as an impregnate is also essential to maximize performance, particularly under HCN and (CN)$_2$ challenge.

Molybdenum has proven to be an important impregnate in the carbons of the present invention, in stabilizing HCN and (CN)$_2$ performance, and in increasing NH$_3$ breakthrough performance across a range of copper and zinc impregnation levels.

Of the various impregnation methodologies, the preferred, and perhaps most reliable, method is the simultaneous impregnation of all necessary constituents using a single impregnation solution. This solution is then utilized in the treatment of an activated carbon substrate. In this method, the impregnation solution must be ammoniacal in order to attain complete dissolution of the basic metal carbonates (or oxides). The use of $ZnSO_4$, $CuSO_4$ and/or basic metal carbonates or oxides, $ZnCO_3$, $ZnO$, $CuCO_3$ and/or $CuO$ can be used to achieve the desired metal loadings. The necessary sulfate levels may be achieved by adding sulfate by a number of different means. Methods of preparation may include one, two or more impregnation cycles by liquid, spray or other application of the selected impregnates.

The activated carbons of the present invention can be tailored according to the described formulations to meet specific desired performance characteristics for any number of industrial and other needs. Although the impregnated carbons offered by the present invention have been described in detail in the foregoing for purposes of illustration, it is to be understood that such details are solely for that purpose and that variations may be made therein by those skilled in the art without departing from the spirit and scope of the invention as described in the following claims.

What is claimed:

1. An activated carbon adsorbent for removing noxious gases and vapors from a contaminated air stream, said activated can having impregnated therein at least one compound selected from each of three groups of compounds said three groups of compounds consisting of
   (a) sulfuric acid and sulfuric acid salts,
   (b) molybdenam compounds, and
   (c) copper compounds and zinc compounds,
   wherein said at least one sulfuric acid or salt thereof compound is present in amounts, by weight, up to 10% as sulfate, said at least one molybdenum compound is present in amounts up to 10% by weight, as molybdenum, and wherein the total amount of copper or zinc compounds present is a total amount not greater than 20% by weight as total copper and zinc.

2. An activated carbon adsorbent as set forth in claim 1, additionally including up to about 25% water, by weight, based upon the dry weight of said impregnated adsorbent.

3. An activated carbon adsorbent as set forth in claim 1, wherein said sulfuric acid or salt thereof compound is present in an amount from about 2.5 to 4.5%, by weight, as surfate, said copper compound is present in an amount from about 6 to 13%, by weight, as copper, said molybdenum compound is present in an amount from 1 to 4%, by weight, as molybdenum, and additionally including from about 5 to 10% water, by weight, based upon the dry weight of said impregnated activated carbon.

4. An activated carbon adsorbent as set forth in claim 1, wherein said copper compounds and said zinc compounds are impregnated on the activated carbon using at least one solution which contains at least one impregnate from the group of solutes consisting of copper oxide. copper carbonate, zinc carbonate, zinc oxide, ammonia complexes of copper and ammonia complexes of zinc.

5. An impregnated activated carbon adsorbent as set forth in claim 4, additionally including up to about 25%, by weight, water based upon the dry weight of said impregnated adsorbent.

6. An impregnated activated carbon adsorbent as set forth in claim 1, wherein said sulfuric acid or salt thereof compound, calculated as sulfate, is present in an amount from about 2.5 to 4.5% by weight, said copper compound, calculated as copper, is present in an amount from about 6 to 13% by weight, said molybdenum compound, calculated as molybdenum, is present in an amount from about 1 to 4% by weight, and additionally including from about 5 to 10% water, by weight, based upon the dry weight of said impregnated activated carbon.

7. An impregnated carbon adsorbent as set forth in claim 4, wherein the activated carbon is dried after impregnation by heating said activated carbon at up to about its ignition temperature.

8. A method of preparation of an activated carbon adsorbent for use in removing noxious gases and vapors from a contaminated air stream comprising the steps:
   A. Preparing a solution containing at least one compound selected from each of the groups Of compounds said three groups consisting of sulfuric acid or sulfuric acid salt compounds: molylxlenum compounds; and compounds of copper and compounds of zinc;
   B. impregnating activated carbon at least once with said solution;
   C. drying the activated carbon after impregnation by heating said activated carbon at up to about its ignition temperature; and
   D. thereafter impregnating said activated carbon adsorbent with water in an amount, by weight, up to 25% based on dry weight of said impregnated adsorbent.

9. A filter for removing noxious gases and vapors from contaminated gas stream$ comprising an activated carbon adsorbent impregnated with at least one compound from each of three groups of compounds, said three groups consisting of (a) sulfuric acid and sulfuric acid salt compounds; (b) compounds of molybdenum; and (c) copper compounds and zinc compounds; and wherein said at least one sulfuric acid or salt thereof is present in amounts, by weight, not more than 10% as sulfate; said at least one molybdenum compound is present in amounts of not more than 10% as molybdenum and wherein the total amount of said selected copper or zinc compound(s) is present in a total amount not greater than 20%, by weight, as total copper and zinc.

10. A filter as set forth in claim 9, having added thereto up to 25% water, by weight, based upon the dry weight of said impregnated activated adsorbent.

11. A respirator for protection against Types A, B, E, and K toxic agents, said respirator including a filter as set forth in claim 9 or 10.

12. A respirator for protection against materials including chlorine, hydrogen chloride, hydrogen cyanide, sulfur dioxide, hydrogen sulfide, formaldehyde, ammonia, mercaptans, bromine, hydrogen fluoride, hydrogen bromide, methylamine and other amines, phosgene, organic vapors such as carbon tetrachloride and others, said respirator including a filter as set forth in claim 9 or claim 10.

13. A universal filter as set forth in claim 9 wherein a copper compound is provided by a copper compound in solution selected from the group consisting of copper carbonate copper oxide and ammonia complexes of copper, and zinc is a zinc compound in solution selected from the group consisting of zinc carbonate, zinc oxide and ammonia complexes of zinc.

14. A universal filter for the removal of Types A, B, E, and K gases and vapors from contaminated gas streams comprising an activated carbon adsorbent impregnated with about 2.5 to 4.5 % by weight as sulfate of at least one compound selected from the group consisting of sulfuric acid or sulfuric acid salts, and about 6 to 13%, by weight, as copper, of a copper compound, and about 1 to 4%, by weight, as molybdenum, of a molybdenum compound and containing, by weight, 5 to 10% water by dry weight of said adsorbent.

15. A respirator including a filter as set forth in claim 14.

16. An impregnated activated carbon as set forth in claim 4, wherein the activated carbon is impregnated through at least two applications of said impregnation solution and is dried after impregnation by heating the activated carbon up to about its ignition temperature.

17. A method of preparation of an activated carbon adsorbent as set forth in claim 8 wherein said molybdenum compound is selected from the group consisting of compounds containing molybdenum trioxide, $Mo_2O_7^{2-}$, $MoO_4^{2-}$ or hexavalent molybdenum oxyanions; and wherein said at least one cooper compound and zinc compound is selected from the group consisting of copper oxide, copper carbonate, ammonia complexes of copper, zinc carbonate, zinc oxide, and ammonia complexes of zinc; and wherein said sulfuric acid or salt thereof compound is selected from the group consisting of copper sulfate, zinc surfate, ammonium sulfate and sulfuric acid.

18. An impregnated activated carbon as set forth in claim 4, 9, 10 or 12 wherein said sulfuric acid or Salt thereof is selected from the group consisting of copper sulfate, zinc sulfate, ammonium sulfate and sulfuric acid and said molybdenum compound is selected from the group consisting of compounds containing molybdenum trioxide, $Mo_2O_7^{2-}$, $MoO_4^{2-}$ or hexavalent molybdenum oxyanions.

19. An impregnated activated carbon as set forth in claim 4, wherein the activated carbon is impregnated through by a plurality of impregnations, each impregnation having at least one selected impregnate and the impregnated activated carbon being dried after each impregnation by heating the activated carbon up to about its ignition temperature.

* * * * *